US006855859B2

(12) United States Patent
Nolan et al.

(10) Patent No.: US 6,855,859 B2
(45) Date of Patent: Feb. 15, 2005

(54) METHOD FOR CONTROLLING ELEMENTAL MERCURY EMISSIONS

(75) Inventors: Paul S. Nolan, North Canton, OH (US); Ralph T. Bailey, Uniontown, OH (US); William Downs, Alliance, OH (US)

(73) Assignees: The Babcock & Wilcox Company, New Orleans, LA (US); McDermott Technology Inc., New Orleans, LA (US)

( * ) Notice: Subject to any disclaimer, the term of this patent is extended or adjusted under 35 U.S.C. 154(b) by 196 days.

(21) Appl. No.: 09/730,100

(22) Filed: Dec. 5, 2000

(65) Prior Publication Data

US 2002/0068030 A1 Jun. 6, 2002

Related U.S. Application Data

(63) Continuation-in-part of application No. 09/282,817, filed on Mar. 31, 1999, now Pat. No. 6,284,199, and a continuation-in-part of application No. 09/464,806, filed on Dec. 17, 1999, now Pat. No. 6,503,470.

(51) Int. Cl.$^7$ .............................................. B01D 53/64
(52) U.S. Cl. ...................... 588/236; 588/231; 423/107; 423/210; 423/566.1
(58) Field of Search ................................ 588/231, 236; 423/240 R, 210, 566.1, 491, 107

(56) References Cited

U.S. PATENT DOCUMENTS

| 1,897,921 A | 2/1933 | Bacon |
| 3,331,732 A | 7/1967 | Venemark |
| 3,817,713 A | 6/1974 | Ionescu |
| 3,855,387 A | 12/1974 | Brockmiller et al. |

(List continued on next page.)

FOREIGN PATENT DOCUMENTS

| CA | 2158671 | | 7/2001 |
| DE | 3702463 | A1 | 8/1988 |
| DE | 4105058 | A1 | 8/1992 |
| EP | 02078537 | A2 | 1/1987 |
| EP | 0294658 | | 12/1988 |
| EP | 0709128 | A3 * | 10/1997 |
| JP | 52023862 | | 2/1977 |
| JP | 57007232 | | 1/1982 |
| JP | 6245325 | | 2/1987 |
| JP | 62186925 | | 8/1987 |
| JP | 5023540 | | 2/1993 |
| JP | 06296825 | | 10/1994 |
| JP | 07299328 | | 11/1995 |
| JP | 10249154 | | 9/1998 |
| WO | WO-97/19670 | | 6/1997 |
| WO | WO-98/16301 | | 4/1998 |
| WO | WO 99/58228 | | 11/1999 |

OTHER PUBLICATIONS

Zhao, Lynn et al., "Mercury Absorption in Aqueous Hypochlorite," Aug. 1999.

Vidic, R.D. et al., "Uptake of Elemental Mercury Vapors by Activated Carbons," Journal of the Air and Waste Management Association, Mar. 1996, pp. 241–250 V46.

Noblett, Jr. et al., "Control of Air Toxics from Coal–Fired Power Plants Using FPG Technology," Jul. 1993, 15 pages, presented at RPRI Second International Conference on Managing Hazardous Air Pollutants, Washington, DC.

(List continued on next page.)

*Primary Examiner*—Stuart L. Hendrickson
*Assistant Examiner*—Peter J Lish
(74) *Attorney, Agent, or Firm*—Eric Marich; Robert C. Baraona

(57) ABSTRACT

Chlorine and sulfide species are separately introduced to a flue gas passing through a scrubber in order to remove the elemental and oxidized mercury from the gas through the precipitation of mercuric sulfide at near 100% efficiency.

3 Claims, 5 Drawing Sheets

U.S. PATENT DOCUMENTS

| | | | |
|---|---|---|---|
| 3,892,837 A | 7/1975 | Uchiyama et al. | |
| 3,981,972 A | 9/1976 | Hishinuma et al. | |
| 4,044,098 A | 8/1977 | Miller et al. | |
| 4,094,879 A | 6/1978 | Bates et al. | |
| 4,098,697 A | 7/1978 | DeAngelis et al. | |
| 4,190,709 A | 2/1980 | Hodgkin | |
| 4,230,183 A | 10/1980 | Kalfoglou | |
| 4,233,274 A * | 11/1980 | Allgulin | 423/210 |
| 4,273,747 A | 6/1981 | Rasmussen | |
| 4,283,303 A | 8/1981 | Ellis | |
| 4,285,819 A | 8/1981 | Yen et al. | |
| 4,377,484 A | 3/1983 | Nasrallah | |
| 4,443,417 A | 4/1984 | Wiklund | |
| 4,578,195 A | 3/1986 | Moore et al. | |
| 4,729,882 A | 3/1988 | Ide et al. | |
| 4,820,391 A | 4/1989 | Walker | |
| 4,857,183 A | 8/1989 | Boomer | |
| 4,889,698 A | 12/1989 | Moller et al. | |
| 4,889,701 A | 12/1989 | Jones et al. | |
| 4,975,264 A | 12/1990 | Franken | |
| 5,009,871 A | 4/1991 | Higuchi et al. | |
| 5,034,203 A * | 7/1991 | Audeh et al. | 423/210 |
| 5,139,982 A | 8/1992 | Ayala et al. | |
| 5,168,065 A | 12/1992 | Jankura et al. | |
| 5,215,557 A | 6/1993 | Johnson et al. | |
| 5,238,665 A | 8/1993 | Lerner | |
| 5,246,471 A | 9/1993 | Bhat et al. | |
| 5,308,509 A | 5/1994 | Bhat et al. | |
| 5,354,363 A | 10/1994 | Brown, Jr. et al. | |
| 5,357,002 A | 10/1994 | Lezzi et al. | |
| 5,372,940 A | 12/1994 | Sakamoto et al. | |
| 5,380,747 A | 1/1995 | Medford et al. | |
| 5,405,593 A | 4/1995 | Knudson | |
| 5,419,834 A | 5/1995 | Straten | |
| 5,428,154 A | 6/1995 | Gansow et al. | |
| 5,459,040 A | 10/1995 | Hammock et al. | |
| 5,459,276 A | 10/1995 | Kuhn et al. | |
| 5,500,196 A | 3/1996 | Rogers et al. | |
| 5,520,897 A | 5/1996 | Rogers et al. | |
| 5,564,105 A | 10/1996 | Alvino et al. | |
| 5,599,508 A | 2/1997 | Martinelli et al. | |
| 5,622,996 A | 4/1997 | Fish | |
| 5,672,323 A | 9/1997 | Bhat et al. | |
| 5,750,351 A | 5/1998 | Medford et al. | |
| 5,773,209 A | 6/1998 | Medford et al. | |
| 5,773,231 A | 6/1998 | Medford et al. | |
| 5,783,596 A | 7/1998 | Medford et al. | |
| 5,785,735 A | 7/1998 | Raskin et al. | |
| 5,792,787 A | 8/1998 | Medford et al. | |
| 5,795,548 A | 8/1998 | Madden et al. | |
| 5,807,884 A | 9/1998 | Medford et al. | |
| 5,809,693 A | 9/1998 | Chet et al. | |
| 5,811,449 A | 9/1998 | Medford et al. | |
| 5,814,288 A | 9/1998 | Madden et al. | |
| 5,814,591 A | 9/1998 | Mills et al. | |
| 5,821,260 A | 10/1998 | Medford et al. | |
| 5,827,352 A | 10/1998 | Altman et al. | |
| 5,834,525 A | 11/1998 | Fish | |
| 5,846,959 A | 12/1998 | Medford et al. | |
| 6,214,304 B1 * | 4/2001 | Rosenthal et al. | 423/210 |
| 6,284,199 B1 * | 9/2001 | Downs et al. | 422/168 |
| 6,284,208 B1 | 9/2001 | Thomassen | |
| 6,328,939 B1 | 12/2001 | Amrhein | |
| 6,372,187 B1 | 4/2002 | Madden et al. | |
| 6,447,740 B1 | 9/2002 | Caldwell et al. | 423/210 |
| 6,503,470 B1 | 1/2003 | Nolan et al. | |

OTHER PUBLICATIONS

Chang, R. et al., "Developing Mercury Removal Methods for Power Plants," EPRI Journal, Jul./Aug. 1994, pp. 46–49.

Felsvang, K. et al., "Air Toxics Control by Spray Dryer Absorption Systems," Nov. 1992, pp. V1–1–V1–17, presented at Power–Gen '92, Orlando, FL.

Chang, R. et al., "Mercury Emission Control Technologies: An EPRI Synopsis," Power Engineering, Nov. 1995, pp. 51–57.

"Emission Factors Handbook: Guidelines for Estimating Trace Substance Emissions from Fossil Fuel Steam Electric Plants," Nov. 1995, pp.: Cover, Report Summary, 2, 2–11, 2–12 & 2–13, EPRI, TR–105611s.

"Properties of EDTA, DTPA, HEDTA, and NTA", 1974, 2 pages, advertisement by The Dow Chemical Company.

Hall, E.H., "Mercury Emissions and Controls," Status Report from Battelle Memorial Institute, May 1, 1994, 94TEC–1, 49 pages, Columbus, OH.

Meu, R., "The Fate of Mercury in Coal–Fired Power Plants and the Influence of Wet Flue–Gas Desulphurization," Water, Air and Soil Pollution, 1991, pp. 21–29, 56:21–33.

Gleiser, R. et al., "Mercury Emission Reduction Using Activated Carbon with Spray Dryer Flue Gas Desulfurization," Apr. 25–27, 1994, pp. 452–457, presented at the 36th Annual Meeting American Power Conference, Chicago, IL.

Gleiser, R. et al., "Control of Mercury from MSW Combustors by Spray DRyer Absorption Systems and Activated Carbon Injection," 1993, pp. 106–122, MSW Conference Proceedings, Williamsburg, VA.

Peterson, J., "Mercury Removal by Wet Limestone FGD Systems: EPRI HSTC Test Results (94–RP114B.01)," Jun. 19–24, 1994, pp. 1–16, presented at the 87th Annual Meeting & Exhibition of Air & Waste Management Association, Cincinnati, OH.

Chang, R. et al., "Pilot Scale Evaluation of Activated Carbon for the Removal of Mercury at Coal–Fired Utility Power Plants," Jul. 13–15, 1993, pp. 1–17, presented at the 2nd International Hazard Pollution Management, Washington, DC.

Gullett, B.K., et al., "Bench–Scale Sorption and Desorption of Mercury with Activated Carbon," Mar. 30–Apr. 2, 1993, 8 pages presented at the International Conference MWC, Williamsburg, VA.

Licata, A. et al., "An Economic Alternative to Controlling Acid Gases, Mercury and Dioxin from MWCs (94–MP17.06)," Jun. 19–24, 1994, pp. 1–21, presented at the 87th Annual Meeting & Exhibition for Air & Waste Managment Association, Cincinnati, OH.

Chang, R., et al., "Sorbent Injection for Flue Gas Mercury Control (94–WA68A)," Jun. 1994,13 pages, presented at the Air & Waste Management Association Conference, Cincinnati, OH.

Jones, C., "Consensus on Air Toxics Eludes Industry to Date," Power, Oct., 1994, pp. 51–52, 55–56 & 58–59.

Morency, J.R., "Control of Mercury in Fossil Fuel–Fired Power Generation," Jul. 21, 1994, pp. 1–7, presented at DOE Contractors Meeting, Pittsburgh, PA.

Steam/its generation and use, 40th Edition, 1992, pp.: Cover, ii, 35–1—35–16, The Babcock & Wilcox Company.

Redinger, K.E. et al., "Mercury Emissions Control in RGD Systems," Aug. 25–29, 1997, 17 pages, presented at the EPRI/DOE/EPA Combined Utility Air Pollutant Control Symposium, Washington, DC.

Holmes, M.J. et al., "Advanced Emissions Control Development Program," Jul. 21–23, 1998, 16 pages, presented at the Advanced Coal–Based Power and Environmental Systems '98 Conference, Morgantown, WV.

Farthing, G.A. et al., "B&W's Advanced Emissions Control Development Program," Mar. 20–23, 1995, 12 pages, presented at the 20th International Technical Conference on Coal Utilization & Fuel Systems, Clearwater, FL.

Redinger, K.E. et al., "Mercury Speciation and Emissions Control in FGD Systems," Mar. 17–20, 1997, presnted at the 22nd International Technical Conference on Coal Utilization & Fuel Systems, Clearwater, FL.

Holmes, M.J. et al., "Control of Mercury in Conventional Flue Gas Emissions Control Systems," Nov. 12–14, 1997, 17 pages, presented at the Managing Hazardous Air Pollutants Conference, Washington, DC.

Livengood et al., "Improved Mercury Control in Wet Scrubbing Through Modified Speciation," Aug. 25–29, 1997, 16 pages, presented at the EPRI/DOE/EPA Combined Utiltity Air Pollutant Control Symposium, Washington, DC.

J. Phys. Chem. Ref. Data, 1985, pp. 803–806, vol. 14, Suppl. 1, JANAF (Joint Army, Navy & Air Force) Thermochemical Tables.

J. Phys. Chem. Ref. Data, Dec. 31, 1961, 2 pages, 2nd Edition, JANAF (Joint Army, Navy & Air Force) Thermochemical Tables.

Handbook of Chemistry and Physics, 1976–1977, p. B–131, 57th Edition, CRC.

Redinger, K.E. et al., "Mercury Emissions Control in RGD Systems," Aug. 25–29, 1997, 17 pages, presented at the EPRI/DOE/EPA Combined Utiltity Air Pollutant Control Symposium, Washington, DC.

* cited by examiner

METHOD FOR CONTROLLING ELEMENTAL MERCURY EMISSIONS

CROSS REFERENCE TO RELATED APPLICATIONS

This application is a continuation-in-part of U.S. patent application Ser. No. 09/282,817 (filed on Mar. 31, 1999), now issued U.S. Pat. Nos. 6,284,199, and 09/464,806 (filed on Dec. 17, 1999), now issued U.S. Pat. No. 6,503,470, which are both incorporated by reference herein.

FIELD AND BACKGROUND OF THE INVENTION

The present invention is drawn generally to a process for enhancing air quality and restoring the environment through the removal of elemental mercury from gases released to or present in the atmosphere, and drawn more specifically to a method for controlling mercury emissions from flue gases.

In recent years, research has been performed to measure and control the emissions of Hazardous Air Pollutants (HAPs) from coal-fired utility boilers and waste-to-energy plants. The initial results of several research projects showed that the emissions of heavy metals and volatile organic carbons (VOCs) are very low, except for mercury (Hg). Unlike most of the other metals, most of the mercury remains in the vapor phase and does not condense onto fly ash particles at temperatures typically used in electrostatic precipitators and fabric filters. Therefore, it cannot be collected and disposed of along with fly ash like the other metals. To complicate matters, mercury can exist in its oxidized ($Hg^{+2}$) form as, for example, mercuric chloride, ($HgCl_2$), or in its elemental ($Hg^0$) form as vaporous metallic mercury. The relative amount of each species appears to depend on several factors such as fuel type, boiler combustion efficiency, the type of particulate collector installed, and various other factors.

The search for industrially acceptable methods for the capture of mercury from industrial flue gases has included a significant effort to determine how much mercury can be removed by existing, conventional air pollution control equipment, such as wet or dry scrubbers.

Accordingly, tests have been performed on several commercial scale and pilot scale wet scrubbers, which are designed for the capture of sulfur oxides and other acid gases. These tests have produced some expected and some surprising results. It was generally expected that the oxidized mercury would be easily captured and the elemental mercury would be difficult to capture. These expectations were based on the high solubility of mercuric chloride in water and the very low solubility of elemental mercury in water. This expectation was generally fulfilled.

The surprising result concerned elemental mercury. Repeated tests, during which the concentration of elemental mercury in the flue gas was measured, revealed that more elemental mercury was leaving the wet scrubber than was entering.

One postulate proposed to explain the cause of the elemental mercury generation in the wet scrubber is described for example, by the following general reactions:

$$M_e^x + Hg^{+2} \rightarrow M_e^{x+2} + Hg^0$$

$$2M_e^x + Hg^{+2} \rightarrow 2M_e^{x+1} + Hg^0$$

$M_e$ is any number of transition metals, such as Fe, Mn, Co, etc., or other metals, such as Sn, that may be present in one of several possible oxidation states, x. These or other chemically reducing species may result in elemental mercury generation.

Transition metal ions are generally present in wet scrubber slurries as impurities in the industrial applications of concern. Thus, as the mercuric chloride is absorbed, a portion reacts with and becomes reduced by trace levels of transition metals and metal ions and, because of its low solubility, the elemental mercury is stripped from the liquid and returned to the flue gas.

Most of the recent efforts to capture and remove mercury from the flue gas produced by coal-fired units have concentrated on gas-phase reactions with introduced reagents such as activated carbon.

Alternatively, U.S. patent application Ser. Nos. 09/282,817 ("Use of Sulfide-Containing Gases and Liquors for Removing Mercury from Flue Gases") and 09/464,806 ("Use of Sulfide-Containing Liquors for Removing Mercury from Flue Gases"), describe a means in a wet or dry scrubber to rapidly precipitate the oxidized mercury at the gas/liquid interface in the scrubber before it can be reduced by the transition metals. One of the most insoluble forms of mercury is mercuric sulfide (HgS), which in mineral form is cinnabar. Means for supplying a source of sulfide to react with the oxidized mercury include use of hydrogen sulfide ($H_2S$) and/or aqueous sulfide ions. Thus, at the gas/liquid interface in the scrubber, the following reactions are proposed for the absorption and precipitation of ionized (oxidized) mercury (depending upon whether the sulfide is derived from hydrogen sulfide gas, aqueous sulfide ions, or some other sulfide ion source):

$$S^{-2}(aq) + HgCl_2(g) \rightarrow HgS(s) + 2Cl^-(aq)$$

and/or $$H_2S(g) + HgCl_2(g) \rightarrow HgS(s) + 2H^+(aq) + 2Cl^-(aq)$$

HgS has a solubility product of $3 \times 10^{-52}$ and therefore precipitates essentially completely. The aqueous sulfide species is added to the scrubbing liquor of the scrubber and comes into contact with the mercury in the flue gas, such that HgS is formed when the mercury is absorbed into the liquor. Likewise, in the case of hydrogen sulfide gas, there is good reason to expect that the precipitation reaction proceeds faster than the reduction reactions. Specifically, in the case of the precipitation reaction, both reactants are well mixed in the gas phase. Thus, as they diffuse from the gas to the gas/liquid interface, both reactants can react instantly at the interface. By contrast, the reduction reactions require that the reactants, i.e., the $Hg^{+2}$ and the transition metal ion or other chemically reducing species, diffuse in the liquid phase to a reaction plane in the liquid. Liquid phase diffusion is orders of magnitude slower than gas phase diffusion.

Therefore, using gas and/or aqueous sulfide species, the oxidized mercury will rapidly precipitate as cinnabar in the scrubber and thereby prevent the reduction of that mercury back to vaporous elemental mercury. The precipitation of mercury as cinnabar has a distinct advantage over other mercury sequestering methods in that it converts mercury to a very insoluble form. In this way, the mercury should be inert and effectively removed from the food chain.

However, the methods discussed above all have one significant limitation—the amount of the elemental mercury in the flue gas, Specifically, these methods all require the mercury to be in its oxidized state (such as $HgCl_2$), but the relative amount of oxidized vs. elemental mercury species appears to depend on several factors such as fuel type, boiler combustion efficiency, the type of particulate collector installed, and various other factors. Consequently, scrubbers treating a flue gas with only half of the mercury in an oxidized form and half in an elemental form will be limited to a total mercury removal of only about 50%. A method which permits complete removal of all mercury, both oxidized and elemental, would be welcome by the industry.

U.S. Pat. No. 5,009,871 describes a method in which chlorine is added to a scrubbing solution in a proper form to prevent the chemical reduction of absorbed mercuric chloride and mercury forming complex ions with chlorine. This method is specifically directed at the capture of gaseous mercuric chloride as found in waste incinerators. The method excludes the elemental mercury and does not address the fate of the mercury once it is in solution.

U.S. Pat. No. 4,443,417 describes a method and apparatus by which elemental mercury can be removed from a gas stream using chlorine as an oxidant. However, this process uses an acidic liquid containing sulfuric acid ($H_2SO_4$), hydrochloric acid (HCl) and hydrogen fluoride (HF) in a concentration of about 1% by weight, thereby requiring the handling of potentially dangerous materials. Furthermore, this method is not applicable to alkaline slurries of the type used for sulfur dioxide ($SO_2$) removal from flue gases.

Zhao and Rochelle ("Mercury Absorption in Aqueous Hypochlorite," published in August 1999) have shown that elemental mercury can be absorbed into aqueous hypochlorous solutions and that gas phase molecular chlorine ($Cl_2$) assisted in the absorption of elemental mercury by an aqueous solution. However, this article simply demonstrates the feasibility of the reaction, and fails to mention any practical application for the reaction.

European Patent WO9958228 describes the addition of chlorine to flue gas for the purpose of oxidizing elemental (metallic) mercury vapor (as well as nitrogen oxides ($NO_x$), $SO_2$, and $H_2S$) to form mercuric chloride, which is then absorbed by the sulfuric acid solution that results from the conversion of $SO_2$ to $H_2SO_4$. The mercuric chloride is then precipitated using an alkali metal halogen salt such as potassium iodide (KI). According to this method, the chlorine must be injected into the flue gas at a temperature in excess of 100° C. where the mercury is oxidized in the gas phase and the mercuric chloride is absorbed into an acidic sulfuric acid solution. It specifically does not include alkali or alkaline slurries, the addition of chlorine to the aqueous phase, or the precipitation of the absorbed mercury as mercuric sulfide, while at the same time including the oxidation of $H_2S$, which is viewed as a detrimental and unwanted reaction because sulfide species ($H_2S$ and/or aqueous sulfide species) are needed to assist in the sequestration of mercury.

In light of the foregoing, a method which permits selective or complete control of the removal of all mercury species from flue gases and/or which does not require high temperature injection schemes would be welcome by the industry. Likewise, a method which does not require the handling of dangerous materials and/or which selectively oxidizes elemental mercury is needed.

SUMMARY OF THE INVENTION

The present invention provides a method for controlling or almost completely eliminating both oxidized and elemental mercury emissions in flue gases. Specifically, molecular chlorine and/or an aqueous species of chlorine (e.g., hypochlorous acid salts) are added to the flue gas entering the wet scrubbing zone so it can be performed either externally or internally to the scrubbing vessel. The addition of chlorine species oxidizes the elemental form of mercury, according to the following reactions:

$$2H^+(aq)+2OCl^-(aq)+Hg^0 \rightarrow Hg^{+2}(aq)+Cl_2(g)+2OH^-(aq)$$

and/or $$2H^+(aq)+2Cl^-(aq)+Hg^0 \rightarrow HgCl_2(aq)+H_2(g)$$

and/or $$Cl_2(g)+Hg^0 \rightarrow HgCl_2(aq)$$

As a result of this pre-treatment, subsequent treatment of the pre-chlorinated flue gas to remove oxidized mercury, via any known means, will allow removal of mercury present in the gas at an efficiency approaching 100%. Alternatively, the pre-treatment step may be adjusted to permit the removal of mercury at a specified efficiency.

The invention comprises providing a flue gas having a quantity of elemental mercury, treating the flue gas with at least one of chlorine and an aqueous chlorine species to convert the elemental mercury to oxidized mercury, and subsequently removing the oxidized mercury. Preferably, the aqueous chlorine species is a hypochlorous acid salt, such as hypochlorite. The removing the oxidized mercury step may include treating the flue gas with at least one of hydrogen sulfide gas and/or an aqueous sulfide species. Notably, the addition of chlorine and sulfide species must be performed separately to avoid any unwanted reactions between the two prior to the precipitation of oxidized mercury (subsequent to the precipitation of mercuric sulfide, reactions between the chlorine and sulfide species are immaterial).

Thus, an object of this invention is to provide a method to selectively or completely remove mercury from a flue gas.

Another object of the invention is to describe a specific, sequential method for completely removing mercury not previously known or contemplated by those skilled in the art.

A further object of this invention is to provide a method of mercury control which does not require the handling of hazardous chemicals or the necessity of injecting chlorine gas at excessively hot temperatures.

Still another object of the invention is to provide a method of removing elemental mercury from flue gas interchangeably using the same wet scrubbing devices that are used by the electric utility industry to remove other pollutants, including but not limited to equipment used to remove sulfur dioxide from flue gas. This interchangeability would allow the present invention to be more easily incorporated into currently-existing flue gas treatment equipment.

Yet another object of this invention is to minimize the oxidation of gas species other than vaporous elemental mercury. Such gas species include: $SO_2$, $NO_x$, and/or $H_2S$. Oxidation of these gases can respectively lead to: formation of corrosive sulfuric acid mist, unwanted brown plumes in the flue gas effluent from the stack, and reduction of the sulfide species required to subsequently sequester mercury (via precipitation as mercuric sulfide) downstream from the oxidation point.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
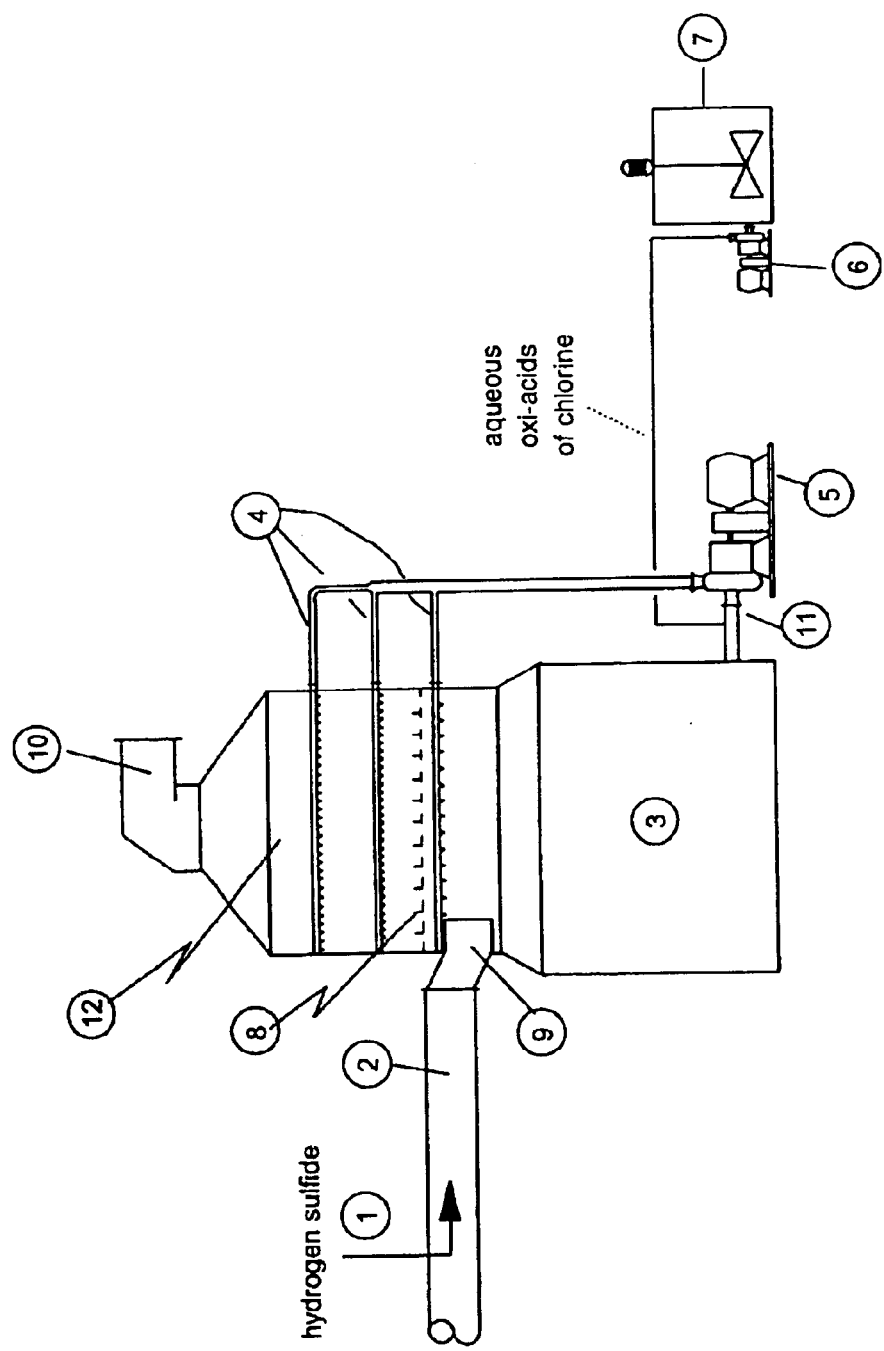
FIG. 1 is a schematic representation of one embodiment of the present invention.

As disclosed in related patent applications, namely in U.S. patent application Ser. Nos. 09/282,817 ("Use of Sulfide-Containing Gases and Liquors for Removing Mercury from Flue Gases," filed on Mar. 31, 1999) and 09/464,806 ("Use of Sulfide-Containing Liquors for Removing Mercury from Flue Gases," filed on Dec. 17, 1999) incorporated by reference herein, the addition of sulfide species sequesters the oxidized mercury species absorbed into the scrubber liquor. Data shows that gas-phase elemental mercury passes through the wet scrubber, since elemental mercury has an extremely low solubility in aqueous solutions.

However, the total mercury removal efficiency of a wet scrubber is limited according to the speciation of the oxidized phase mercury in the flue gas when using these related inventions. Thus, scrubbers treating flue gas with only half of the mercury in an oxidized form and half in an elemental form will be limited to total mercury removal of about 50%. Converting the elemental mercury to a soluble oxidized form according to the present invention will permit removal efficiency of mercury that is not limited by the low solubility of elemental mercury vapor. The combination of chlorine and sulfide addition to the flue gas/scrubber slurry provides for the capture of the elemental gas-phase mercury that would ordinarily pass through the scrubber.

The present invention should also be able to remove mercury while still effectively controlling costs related to flue gas treatment. To illustrate this point, the following example is offered: an 800 MWe power plant serves the needs of about one million people in the United States. A power plant of this size will burn about 300 metric tons of coal per hour. This power plant will produce about 3,000,000 Nm$^3$ per hour of flue gas. This flue gas will contain mercury to the extent of about 5 to 30 micrograms per Nm$^3$. Taking a nominal value of 20 μg/Nm3, this 800 MWe power plant will emit about 60 grams per hour of uncontrolled mercury. This is equivalent to about 0.3 g moles per hour. It takes one mole of sodium hydrosulfide (NaHS) react with one mole of oxidized mercury according to the following reaction:

$$Hg^{+2} + HS^- \rightarrow HgS(s) + H^+$$

If half of the total mercury in this example is oxidized mercury, then the stoichiometric equivalence will require (0.5)(0.3)=0.15 g moles per hour of NaHS. If the NaHS is delivered to the wet scrubber as a 2 molar solution, then the minimum requirement will be 0.15/2=0.075 liters per hour or 75 ml per hour. That's about 5 tablespoons per hour for an 800 MWe power plant. As a practical matter, a much higher reagent flow rate of NaHS is required for effective mercury control. It has been determined by pilot plant tests that a stoichiometric ratio of NaHS to Hg$^{+2}$ of about 100 is required to effective control of mercury. The higher quantity of NaHS is required to insure adequate mixing of reactants and to speed the kinetics of the reaction. The above reaction is first order in both Hg$^{+2}$ and HS$^-$ such that the reaction rate can be expressed by:

$$r = k[Hg^{+2}][HS^-]$$

Thus, the reaction rate is about 100 times faster at a stoichiometry of 100 than it would be at minimum stoichiometry. At the higher stoichiometry the reagent flow requirement in this example will be 7.5 liters. This rate is negligible from a cost standpoint. NaHS is valued at about $0.25 per pound. The reagent cost for a 800 MWe power plant amounts to about $0.45 per hour or about $0.00000057 per kilowatt hour.

The quantity of chlorine require to oxidize elemental mercury is comparable to the sulfide requirement. The stoichiometric reaction is represented by:

$$Hg^0 + HOCl + H^+ \rightarrow Hg^{+2} + Cl^- + H_2O$$

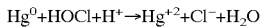

Thus, one mole of hypochorous acid reacts with one mole of elemental mercury. Or if chlorine is used directly, one mole of chlorine reacts with one mole of elemental mercury. The cost of chlorine is about $300 per ton. At a stoichiometric ratio of 100, the chlorine reagent costs in this example are about $0.35 per hour or $0.00000044 per kilowatt-hour.

Referring now to the figures, where like numerals represent similar elements, FIG. 1 is a schematic representation of one embodiment of the present invention. This embodiment consists of a means for injecting gaseous H$_2$S 1 into the flue 2 immediately upstream of wet scrubber 12. The flue gases at this point are dry and in the temperature range of 125° C. to 200° C. The reactivity of dry H$_2$S in the temperature range is relatively low. The H$_2$S laden flue gas enters the scrubber at 9 at an elevation above the liquid level maintained in the sump 3. The flue gases turn upward through a bank of spray nozzles 4 that spray primarily alkali and/or alkaline earth reagents in a water slurry. This slurry reacts primarily with the sulfur oxides present in the flue gas to desulfurize that gas before it is discharged to the atmosphere. In some embodiments, a sieve tray 8 is used to facilitate the desulfurization. In this instance a small quantity of an oxi-acid of chlorine from tank 7 is pumped through pump 6 to the suction side 11 of the recirculation pump 5. These oxi-acids of chlorine can include, but are not exclusively limited to, HClO, HClO$_2$, HClO$_3$, and/or HClO$_4$ or their salts.

The H$_2$S and oxidized mercury react at or near the gas-liquid interface in the gas-liquid contact zone to precipitate mercuric sulfide. Simultaneously, as the pH of the slurry in the gas-liquid contact zone falls, the chlorine compounds in solution decompose to Cl$_2$, Cl$_2$O, and O$_2$. These sparingly soluble gases are stripped from the aqueous phase to the flue gas where they react with and oxidize the elemental mercury in the flue gas. This oxidized mercury then absorbs and reacts with the dissolved sulfide at the gas-liquid interface and precipitates as mercuric sulfide.

There are several methods by which the sulfide species and the chlorine may be added to the scrubber system to oxidize elemental mercury to a soluble species and precipitate the absorbed mercury as mercuric sulfide. In the process of adding these species, it is important that they are added separately so that the chlorine does not react with and remove the sulfide donating species before the reaction with mercury can occur.

Chlorine can be added to the flue gas as a gas, $Cl_2$, or as an aqueous solution of oxi-acids of chlorine, including but not limited to $Cl_2O$, $ClO_2$, $ClO_4$, $ClO$, $HClO$, $HClO_2$, $HClO_3$, and/or $HClO_4$ or their salts. The elemental mercury in the flue gas is oxidized by free chlorine, forming mercuric chloride, which is readily absorbed into the scrubber liquor. Sulfide species added to the scrubber liquor just upstream of the liquor injection nozzles reacts with the absorbed mercuric chloride at the gas-liquid interface, forming a mercuric sulfide precipitate.

Figure 2:
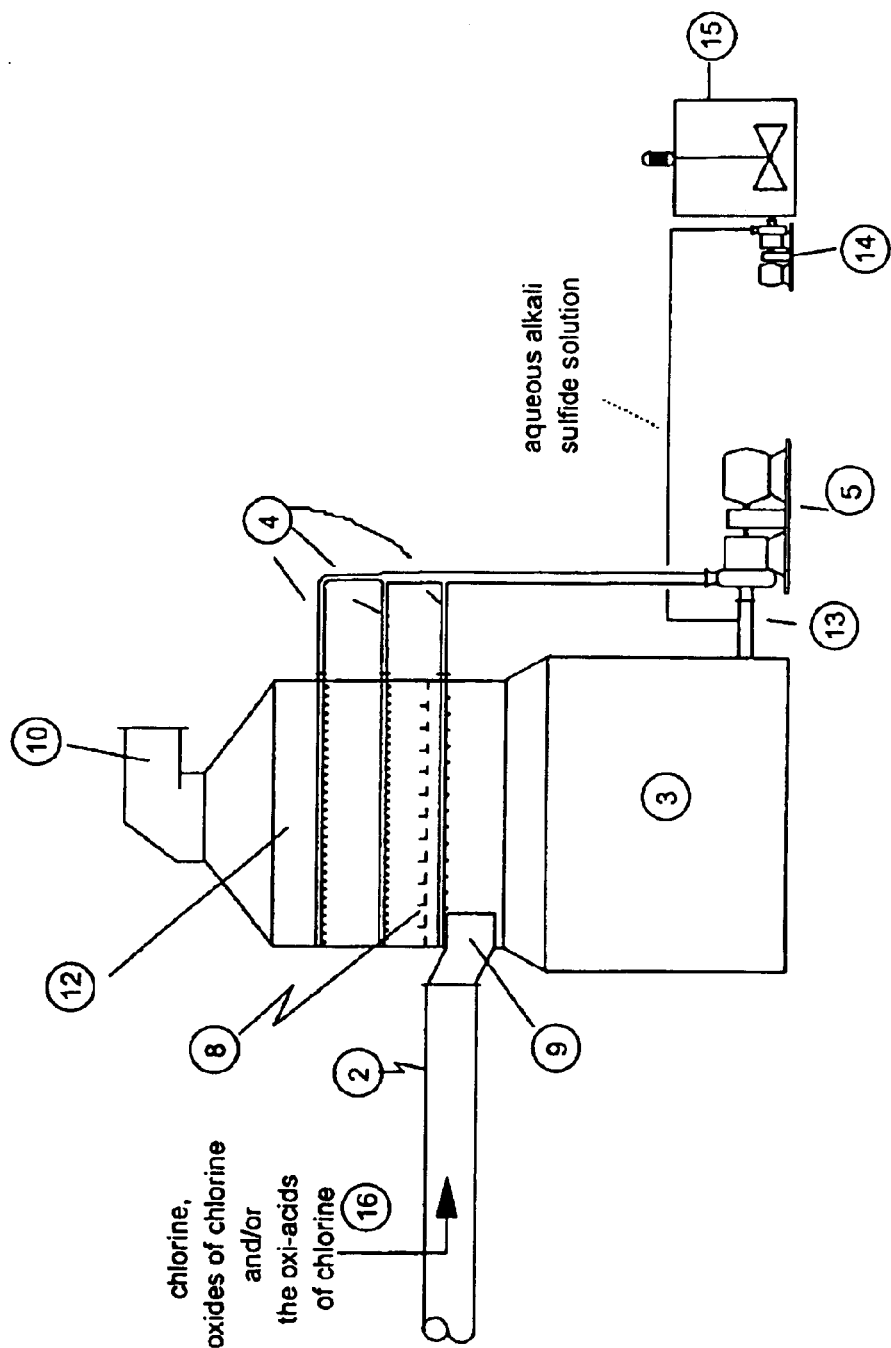
FIG. 2 is a schematic representation of another embodiment of the present invention.

FIG. 2 is a representation of another means by which the oxidation of elemental mercury and the precipitation of mercuric sulfide can be accomplished simultaneously. Here chlorine gas 16, or one of its gaseous oxides (such as $ClO_2$), is injected into flue 2 in the temperature range of 125° C. to 200° C. to mix with the flue gas upstream of the wet scrubber 12. Dry chlorine gas is relatively inert. But wet chlorine gas is a very strong oxidizer. Thus, the volume of flue upstream of the wet scrubber 12 acts primarily as a mixing point of the chlorine with the flue gas. Upon entering the moist environment of the wet scrubber, the chlorine reactivity increases rapidly at which point it oxidizes the elemental mercury. Concurrently, an aqueous solution of a sulfide species, including but not limited to sodium sulfide, sodium hydrosulfide, potassium sulfide, and/or potassium hydrosulfide or mixtures thereof, is pumped from tank 15 to the suction of pump 5 at point 13 via pump 14.

Figure 3:
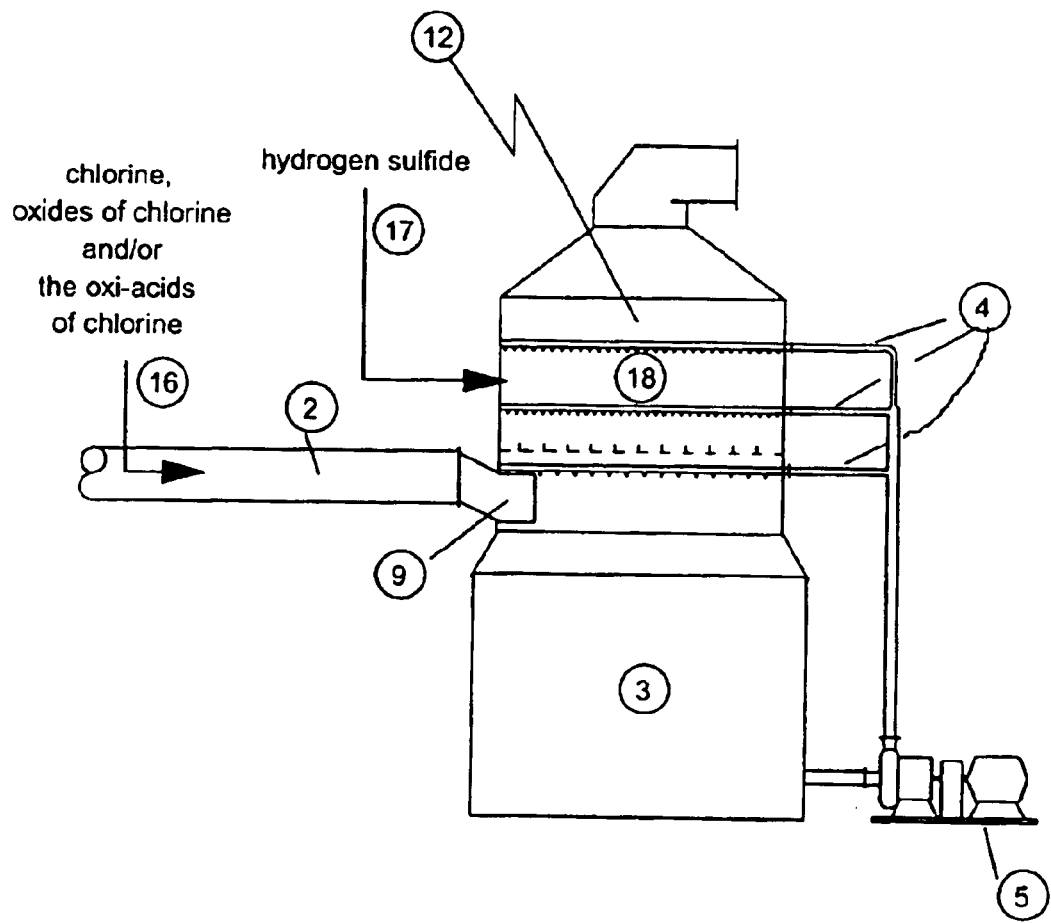
FIG. 3 is a schematic representation of a third embodiment of the present invention.

FIG. 3 represents the scheme where both the chlorine and the $H_2S$ are injected as gases. Normally, injecting these two gases in close proximity to one another would be counter-productive because the chlorine would tend to oxidize the $H_2S$. However, in this scheme, chlorine gas 16 is injected in the flue 2 upstream of the scrubber 12 to provide time for mixing. Upon entering the scrubber at 9 the chlorine reactivity in the presence of water provides the impetus to begin the preferential oxidation of the elemental mercury. Downstream, gaseous $H_2S$ 17 is injected directly into the gas liquid contact zone 18 of the wet scrubber where it rapidly absorbs into the alkaline slurry along with the $SO_2$. An $H_2S$ distribution array (not shown) distributes the $H_2S$ uniformly over the cross-section of the wet scrubber.

Figure 4:
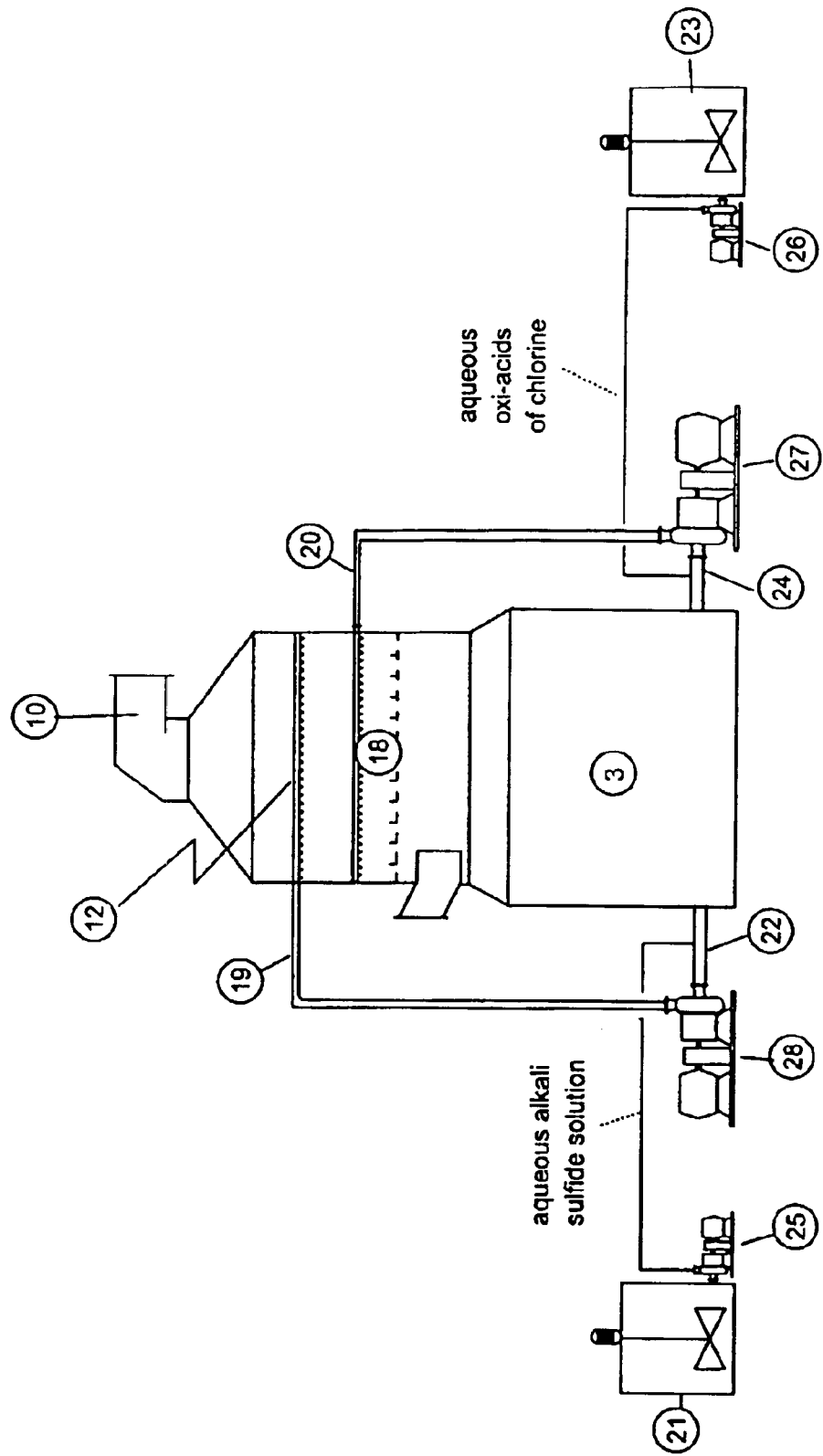
FIG. 4 is a schematic representation of a fourth embodiment of the present invention.

FIG. 4 illustrates a means for injecting both reactants in the liquid phase. Most wet scrubbers designed for flue gas desulfurization have multiple spray headers and multiple recirculation pumps. Typically, a separate recirculation pump is used for each spray level, thereby providing the means to inject each reactant, chlorine and $H_2S$ in a manner that maximizes their exposure to mercury without prematurely reacting with one another. In this scheme, an aqueous oxi-acid of chlorine or a corresponding salt is pumped from tank 23 through pump 26 to the suction side 24 of recirculation pump 27. From there it is pumped along with the recirculation slurry to spray header 20 which delivers the chlorine containing slurry to the gas-liquid contact zone 18. Concurrently, an aqueous alkali sulfide or hydrosulfide solution is pumped from tank 21 through pump 25 to the suction side 22 of recirculation pump 28. From there, the sulfide containing slurry is delivered to spray header 19, where it is sprayed into the gas-liquid contact zone 18.

This particular embodiment has numerous advantages over prior art methods that required injection of a reactant into hot flue gas. In particular, when injecting reactants into flue gas via prior art methods, uniform distribution of the gas or liquid in the flue gas was required in order to achieve a uniform concentration of the reactant, so that the amount of reactant needed to achieve the desired result is minimized. In contrast, using the present invention, no additional dispersing equipment is needed because the existing capability of the spray nozzles to inject aqueous chlorine and/or sulfide species into the scrubbing liquor upstream of the spray nozzles permits use of the existing capability of the spray nozzles without further consideration of uniform distribution (assuming, of course, that the existing spray nozzles have already been aligned for such uniform distribution). However, it is important to remember that, as with the first embodiment, the chlorine and sulfide donating species must be separate before injection into the flue gas to minimize unwanted oxidation-reduction reactions.

Figure 5:
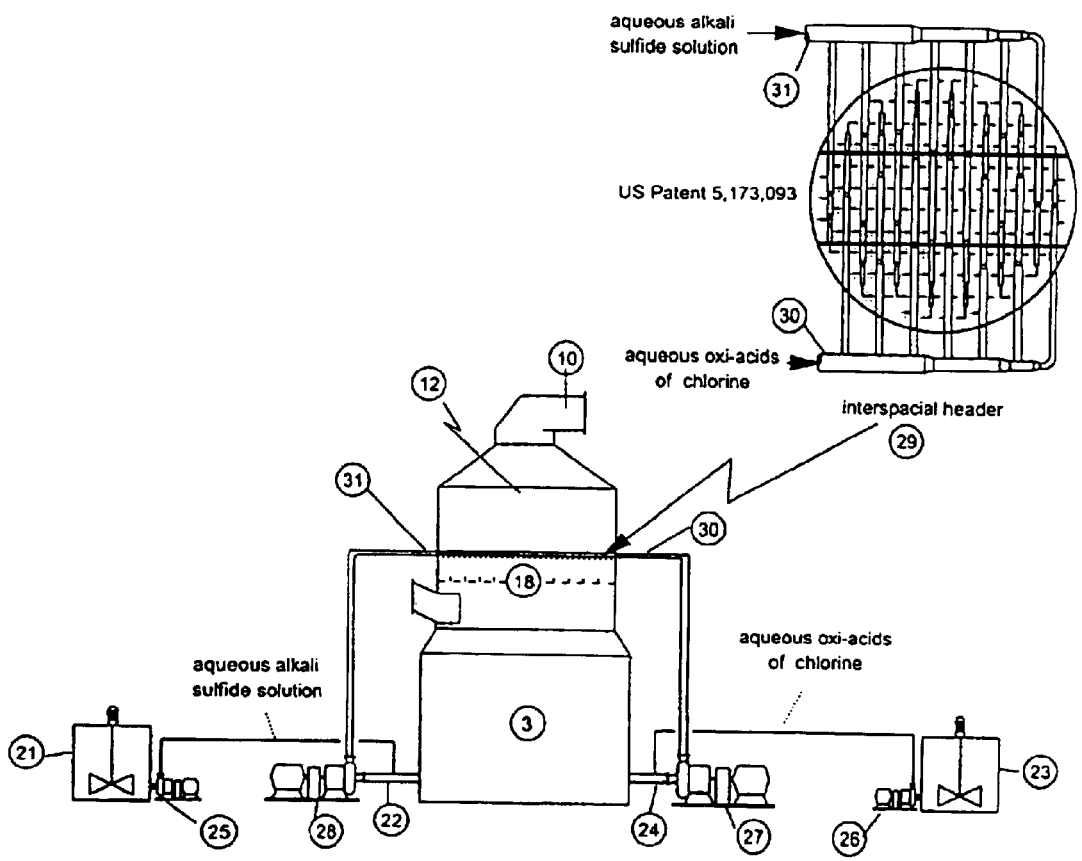
FIG. 5 is a schematic representation of a fifth embodiment of the present invention, and includes an exploded inset view of the preferred interspacial header contemplated by the present invention.

FIG. 5 illustrates a variation on the scheme depicted in FIG. 4. A spray header arrangement referred to as the interspacial header was developed and patented under U.S. Pat. No. 5,173,093, incorporated by reference herein. Notably, use of this patented header is particularly well-suited to the present invention. The interspacial header 29 is supplied by two separate pumps 27, 28. Although the $H_2S$ that evolves from the sulfide containing slurry stream 31 and although the chlorine that evolves from the oxi-acids of chlorine stream 30 will be in close proximity in the gas-liquid zone 18, the stoichiometric excess of reactants will be orders of magnitude larger over the mercury species concentrations. Therefore, even if significant quantities of chlorine and $H_2S$ were to react with one another prematurely, sufficient reactants remain to react with the mercury species.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

We claim:

1. A method for controlling mercury emissions in an industrial process having a flue gas containing insoluble elemental mercury at a concentration between $5-30\,\mu g/Nm^3$, the method comprising:

a) providing the flue gas to a wet scrubber having an aqueous alkali scrubbing liquor;

b) mixing the flue gas with an oxidizing reagent containing chlorine in an amount that is at least double a stoichiometric ratio normally required to oxidize all of the insoluble elemental mercury present in the flue gas;

c) mixing the flue gas with a sulfide species, said sulfide species provided in an amount sufficient to convert the soluble mercury species into insoluble mercuric sulfide;

d) wherein step (b) and step (c) occur separately using an interspatial header, so as to avoid unwanted reactions directly between the chlorine and the sulfide species;

e) creating a gas-liquid interface within the wet scrubber in order to: (i) entrain the insoluble mercuric sulfide generated by step (b) and step (c) within the scrubbing liquor and (ii) remove all mercury species from the flue gas; and f) evacuating the mercury-free flue gas from the wet scrubber.

2. A method according to claim 1, wherein the oxidizing reagent is an oxi-acid selected from the group consisting of: $Cl_2O$, $ClO_2$, $ClO_4$, $ClO$, $HClO$, $HClO_2$, $HClO_3$, and $HClO_4$.

3. A method according to claim 1, wherein the sulfide species is selected from the group consisting of: hydrogen sulfide, aqueous hydrosulfide ions and aqueous sulfide ions.

* * * * *